United States Patent
Lothrop et al.

(10) Patent No.: US 8,208,968 B2
(45) Date of Patent: Jun. 26, 2012

(54) MOBILE FAST ALERTING

(75) Inventors: David Lothrop, Carp (CA); Dany Sylvain, Gatinean (CA)

(73) Assignee: Rockstar Bidco, LP, New York, NY (US)

( * ) Notice: Subject to any disclaimer, the term of this patent is extended or adjusted under 35 U.S.C. 154(b) by 376 days.

(21) Appl. No.: 12/492,565

(22) Filed: Jun. 26, 2009

(65) Prior Publication Data
US 2010/0331055 A1    Dec. 30, 2010

(51) Int. Cl.
*H04B 1/38* (2006.01)
(52) U.S. Cl. .......................................... 455/567
(58) Field of Classification Search ................... 455/567
See application file for complete search history.

(56) References Cited

U.S. PATENT DOCUMENTS

| | | | |
|---|---|---|---|
| 7,170,863 B1 | 1/2007 | Denman et al. | |
| 7,570,922 B2 * | 8/2009 | Williams | 455/67.11 |
| 7,710,950 B2 * | 5/2010 | Buckley et al. | 370/354 |
| 2008/0182575 A1 * | 7/2008 | Torres et al. | 455/435.1 |
| 2011/0164534 A1 * | 7/2011 | Vaishnavi et al. | 370/259 |

FOREIGN PATENT DOCUMENTS

| | | |
|---|---|---|
| EP | 1592216 | 11/2005 |
| WO | WO 2007/009212 | 1/2007 |

OTHER PUBLICATIONS

Written Opinion of the International Searching Authority from corresponding PCT application PCT/CA2010/000967.

* cited by examiner

*Primary Examiner* — Kamran Afshar
*Assistant Examiner* — Yousef Rod
(74) *Attorney, Agent, or Firm* — Withrow & Terranova PLLC (57) ABSTRACT

Where a separate bearer channel is required to be set up in a mobile network to complete a hybrid VoIP call on the mobile network as specified in 3GPP ICS standard TR 23.892, an alerting process may be started after a provisionable delay rather than upon completion of the network call setup. This allows the mobile network user to start responding to the impending call before signaling of the call has been completed, so that the person can answer closer in time to completion of call signaling. Additionally, the person who placed the call may be provided with ringing feedback to make it sound like the call has been completed. The amount of delay between receipt of a SIP invite and the onset of an alerting process may be specified in the mobile handset or may be specified as a header in the SIP invite. The amount of delay may be fixed or adjusted based on feedback.

20 Claims, 5 Drawing Sheets

Figure 1

LEGEND
CS: Circuit Switch
IMS: IP Multimedia Subsystem
MGCF: Media Gateway Control Function
PSTN: Public Switched Telephone Network
PS: Cellular Packet sub-network
SCC AS: Session Continuity and Control Application Server
SIP UA: Session Initiation Protocol User Agent
TSAS: Terminating Services Application Server
UMTS: Universal Mobile Telephone Service – example cellular network
VMSC: Visited Mobile Services Center

MOBILE FAST ALERTING

TECHNICAL FIELD

The present invention relates to communication networks and, more particularly, to a method of enabling fast alerting in a mobile telephone network.

BACKGROUND

Communication services such as voice calls have traditionally been provided via circuit switched (CS) networks, such as the Public Switched Telephone Network (PSTN) or cellular wireless networks. Over the last several years, new means of providing communication services over IP networks have emerged, commonly referred to as Voice over IP (VoIP). A prevalent protocol used to implement VoIP is the Session Initiation Protocol (SIP), which enables not only voice services but also a range of multimedia services such as video, messaging, presence, file transfer, etc.

Within a wired data network, such as an Ethernet Local Area Network or the Internet, there is typically plenty of bandwidth to handle a VoIP communication session. However, in a network where bandwidth is relatively scarce, such as wireless cellular networks, there may be insufficient bandwidth and quality of service control to provide adequate service to implement a VoIP call. To address this issue, new standards such as the 3rd Generation Partnership Project (3GPP) IMS Centralized Services (ICS—TR 23.892) were introduced. ICS provides mechanisms such that all services, and service control, are based on IMS (IP Multimedia Subsystem) mechanisms and enablers, by combining SIP signaling over the wireless packet subsystem (PS) connection to the mobile, while the voice media bearer path is setup over the existing wireless circuit interface (Circuit subsystem—CS), avoiding the bandwidth intensive transport of voice over the IP PS connection. An ICS call can be seen as an hybrid VoIP call, combining packet-based signaling with circuit-based media.

Unfortunately, establishing a call using ICS mechanisms may take up to 9 or 10 seconds as SIP signaling first take place over the PS connection, followed by a voice call setup over CS. This call setup time is a relatively long amount of time, when compared to other signaling processes, which may lead to user dissatisfaction or complaints. Accordingly, it would be advantageous to provide a way to improve the process of establishing hybrid VoIP calls such as ICS calls into a wireless network.

SUMMARY OF THE INVENTION

The user of a mobile network is alerted of an incoming call prior to the full establishment of an hybrid VoIP call where call signaling is done over the wireless packet connection and the voice bearer is setup over a wireless circuit connection. Fast alerting of the called mobile network user enables the person placing the call to receive faster feedback that the call is being completed, and also enables the overall perceived time associated with completing the call to be reduced. Specifically, the mobile network user is able to start to respond to the impending call before the network is fully ready to enable, so that the amount of time it takes to notify the parties may be reduce to make it appear that the signaling process has been shortened. An amount of delay between receipt of a initial call signaling over the wireless packet connection via a SIP invite and the onset of an alerting process may be specified in the mobile handset or may be specified as a header in the SIP invite. The amount of delay may be adjusted based on feedback on a per-user basis or for larger groups of users.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
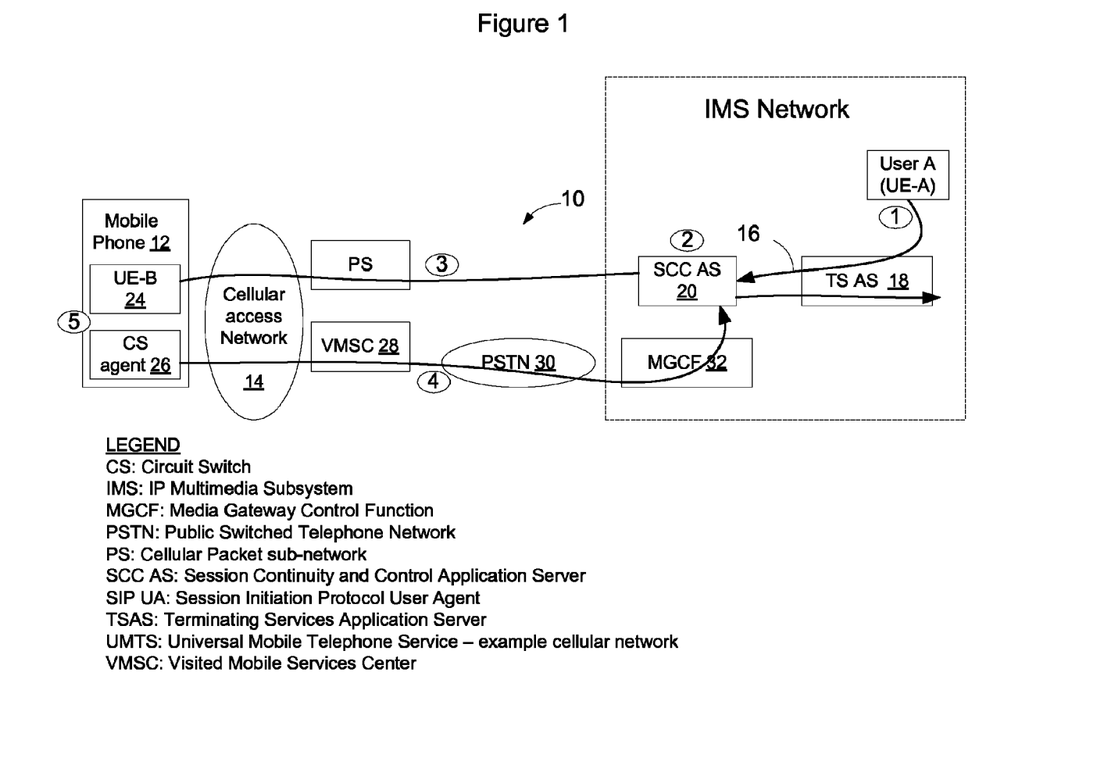
FIG. 1 is a functional block diagram of example reference network showing an example set of functions that may be used to establish a VoIP call into a wireless network.

FIG. 1 shows a reference network 10 in which a communication session may be established between user A and user B using the 3GPP ICS (IMS Centralized Services) standard (TR 23.892). IMS stands for IP Multimedia Subsystem. As provided by that standard, IMS Centralized Services (ICS) provides communication services such that all services, and service control, are based on IMS mechanisms and enablers. It enables IMS services when using CS (circuit-switched) access for the media bearer. With ICS, the user services are provided by IMS. User sessions are controlled in IMS via PS (packet switched) access. The CS core network is utilized to establish a circuit bearer for use as media for IMS sessions. With ICS, IMS sessions using CS media are treated as standard IMS sessions for the purpose of service control and service continuity.

In FIG. 1, an incoming call is placed from user A to DN1 (directory number 1) associated with user B and is first received via a SIP Invite coming over the IMS network from user A (1). The SIP Invite reaches the terminating services application server 10 where terminating services for user B are performed. The SIP Invite is then routed to the Session Continuity and Control Application Server (SCC AS) 20 associated with user B (2). The SCC AS 20 modifies the SIP Invite to indicate that the voice bearer path should be established over the wireless CS. The modified SIP Invite (3) is forwarded over the wireless PS to the user mobile phone 12 where it is received by the local SIP user entity (UE-B) 24.

When UE-B 24 receives the SIP Invite, it then triggers the mobile phone CS agent 26 to initiate a call over the cellular access network 14 using CS methods toward the PSI DN (public service identifier directory number) associated with the SCC AS that it obtained in the SIP Invite (3). The call is processed by the Visited Mobile Services Center VMSC 28 and routed over the Public Switched Telephone Network 30 to the media gateway control function 32. The MGCF 32 turns the inbound CS circuit call into a VoIP call and routes the call to the SCC-AS. The SCC-AS matches the SIP session from UE-A with the SIP session to the PSI DN from the MGCF, and establishes the VoIP media path between the MGCF and UE-A. Additional details about how this process may be implemented are set forth in the 3GPP ICS standard TR 23.892, the content of which is hereby incorporated by reference.

Figure 2:
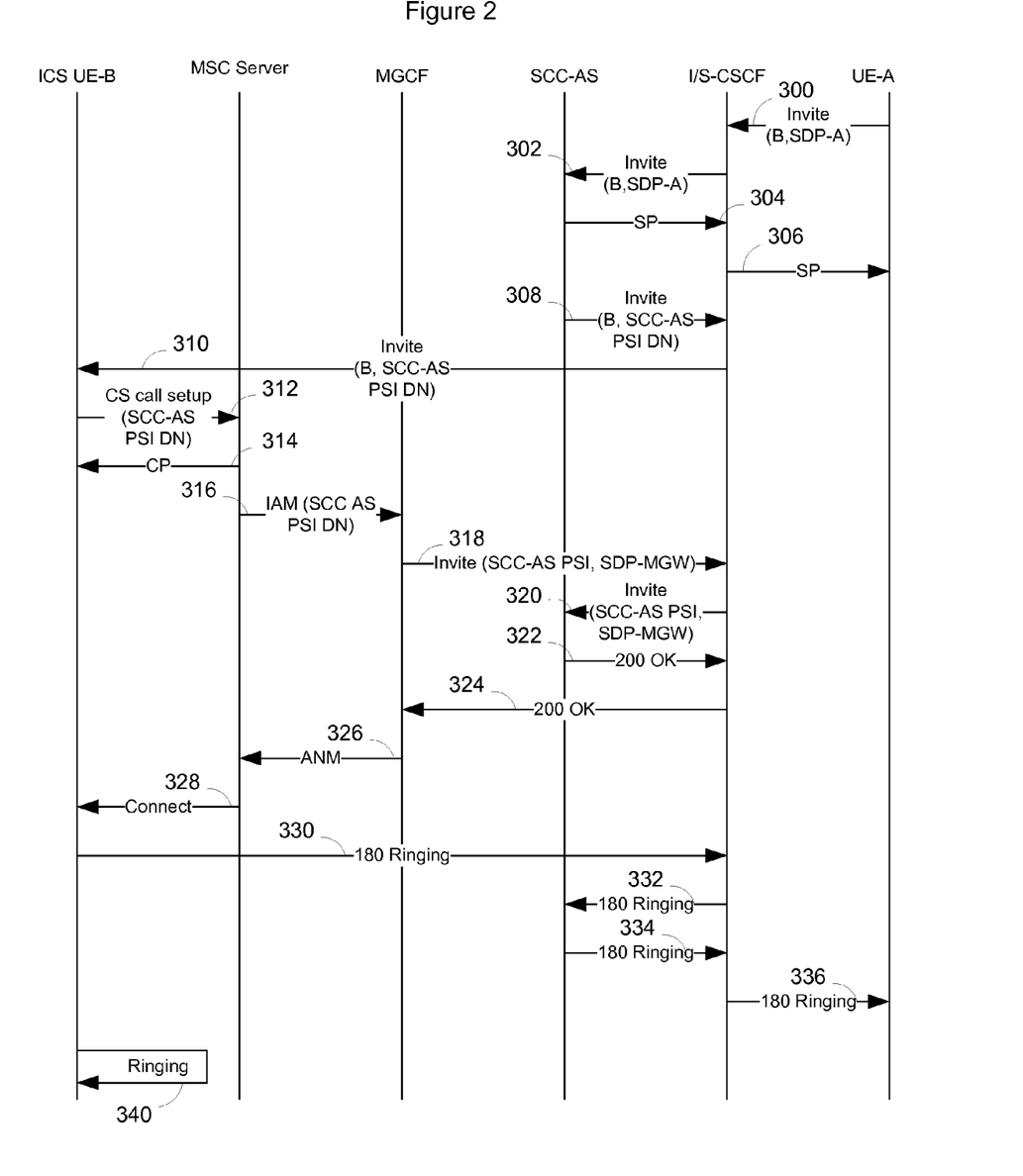
FIG. 2 is a timing diagram showing the flow of messages between components of the reference network of FIG. 1 in connection with creation of a VoIP call into the wireless network.

FIG. 2 shows additional details about the particular signaling that takes place to enable a call of this nature to be established. In this diagram, some of the entities that may participate in the signaling process have been omitted. For example, there may be multiple Call Session Control Functions (CSCFs) that participate in the SIP signaling process. Likewise, the particular way that the bearer channel is established on the network may vary depending on the particular type of network and the wireless protocol version in effect at the time. Accordingly, the signaling diagram shown in FIG. 2 is intended to provide a rough overview of an example signaling process. There may be additional steps implemented at each of the various network elements depending on the particular technology used to implement the network at that particular location and the types of signaling systems being used on the network. This FIG. 2 is intended to provide an overview of the overall process rather than a complete itemization of every message passed between each device during the process.

Specifically, in FIG. 2, when user A sends a SIP invite (300) via the IMS network it will be received by the Interrogating/Serving Call Session Control Function (I/S-CSCF) associated with user B. The invite (300) will be addressed to UE-B and indicate that the session should be established with specific session parameters SDP-A (e.g. codec type, IP address, etc.). The I/S-CSCF will pass the invite to the SCC-AS (302) which will return a Session Progress (SP) message indicating that the session is in progress (304). The I/S-CSCF will likewise pass a SP message (306) toward UE-A.

The SCC-AS will then generate a new invite (308) to UE-B containing the specific PSI DN of the SCC-AS for the CS agent on the mobile to call for completing the call. Invite (308) is passed to I/S-CSCF which relays the invite (310) to UE-B. The SIP signaling process (300-310) is typically fairly fast to implement, and may take on the order of 0.25 seconds to complete.

Since the cellular packet subsystem (PS) may not have sufficient bandwidth and/or quality of service guarantees to successfully implement a voice call, the CS will be invoked to establish a cellular CS voice call to be used as a bearer channel for the call on the cellular access network. Specifically, the CS agent 26 will send a call setup message to the Visited Mobile Services Center server (312) indicating that a call should be placed to the SCC-AS PSI DN. Note, that the SCC-AS PSI DN is received via the SIP Invite 310.

The MSC will pass a Call Progress message back to CS agent (314) and will also send over the PSTN an ISUP (ISDN User Part—standard PSTN trunking protocol) Initial Address Message (IAM) to Media Gateway Control Function (MGCF) (316). MGCF will process the call and generate a SIP invite (318) addressed to the SCC-AS PSI. The invite will be passed to the I/S-CSCF which will pass the invite to the SCC-AS (320).

The SCC-AS will then send a SIP 200 OK message (322) to the I/S-CSCF acknowledging the SIP invite (320), which will be passed from the I/S CSCF to the MGCF (324). Once the SIP call has been established between the SCC-AS and the MGCF, the MGCF will generate an Answer Message (ANM) (326) which will be passed to the MSC Server. The MSC server will connect the bearer channel to the CS agent of the mobile (328).

Once the CS has connected the bearer channel, UE-B will transmit a SIP 180 ringing message toward SCC-AS (330). This message will be received by I/S-CSCF and passed to SCC-AS (322). Upon receipt of the 180 ringing message, the SCC-AS will transmit a 180 ringing message toward UE-A (334). The 180 ringing message will be received by I/S-CSCF and passed to UE-A (336).

Signaling establishment of the bearer channel on the cellular network (312-320) typically takes on the order of about 4 seconds. Likewise, completing establishment of the bearer channel, acknowledging that the call has been established, and matching the call signaling and media channels by the SCC-AS and MGCF also takes on the order of 4 seconds. Thus, establishing a call using this process generally takes on the order of 8-9 seconds, although it may take longer in particular instances. After the CS call has been connected, user B's mobile phone will start ringing (340) to alert the user that a call has been connected. In parallel, the reception of SIP 180 Ringing message (336) will trigger the insertion of audible ringback tone toward user A, indicating to user A that the user B mobile has started ringing.

Once User B answers the call (not shown), the call will be connected between user A and B, with the portion of the call implemented on the wireless network being carried by the CS bearer channel within the wireless network and the portion of the call implemented on the IMS network being implemented via VoIP.

As noted above, it may take up to 10 seconds to complete the signaling process to establish the media path for the SIP call on the data network, establish the CS bearer channel for the call in the wireless network, and connect the two together. This means that user A, who initiated the call, will need to wait 9 or 10 seconds before he receives confirmation, in the form of an audible ringback tone, that the call is going through. To put this in context, it typically takes on the order of one second to establish a phone call using PSTN signaling processes and 5-6 seconds for cellular calls. Since it may take 9 or 10 seconds to connect an hybrid VoIP call to a mobile user, the person who placed the call may believe that the phone call is not being connected and may hang up before the call is able to be completed.

Figure 3:
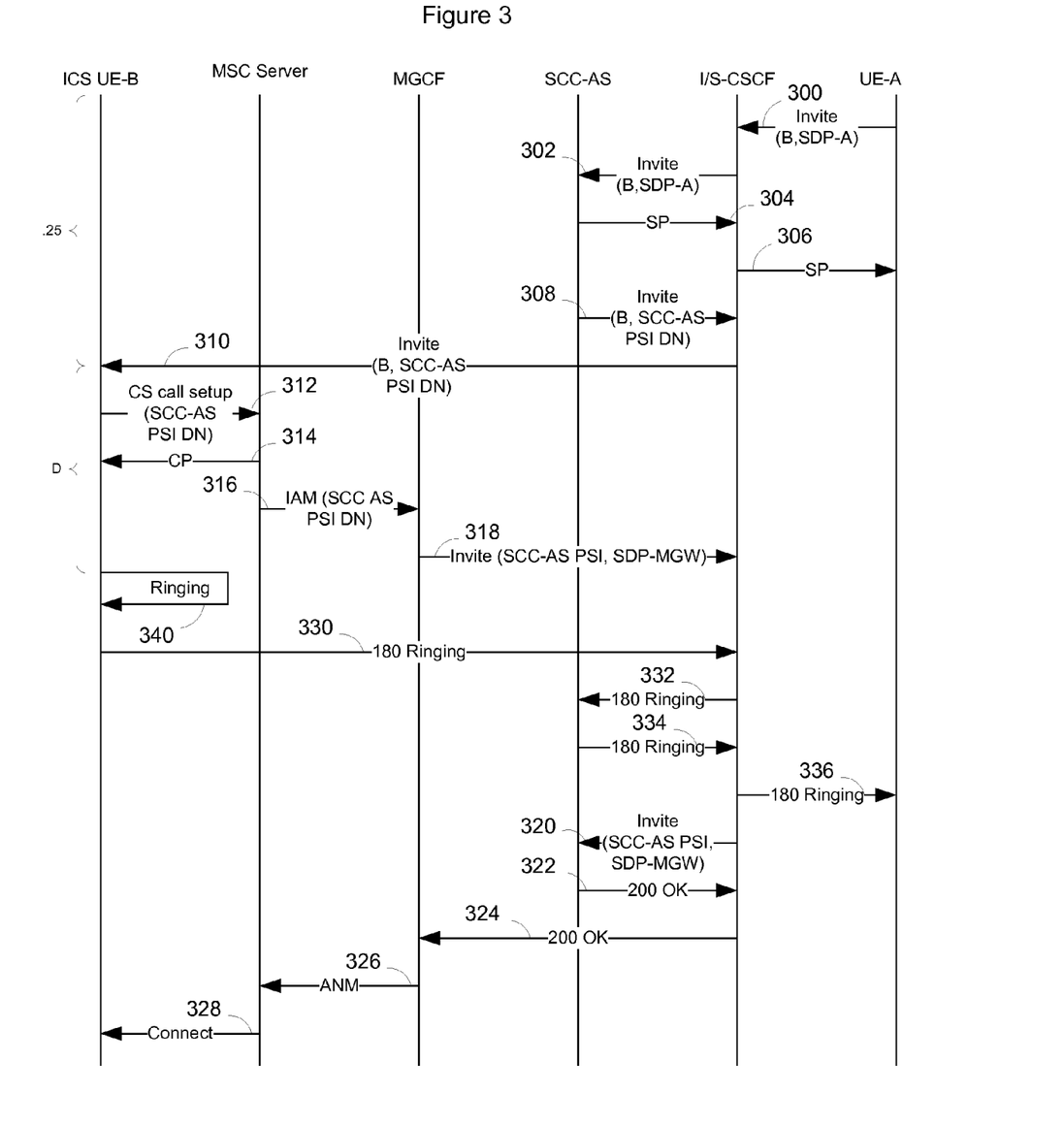
FIG. 3 is a timing diagram showing the flow of messages between components of the reference network of FIG. 1 in connection with creation of a VoIP call into the wireless network according to an embodiment of the invention.

FIG. 3 illustrates an embodiment of the invention which is designed to accelerate the process with which user A is notified that the call is being placed. Specifically, as shown in FIG. 3, once the SIP invite (310) has been provided to UE-B, the mobile phone will wait for a delay period D and then start ringing (340). Ringing, in this context, includes both physical alerting of user B, such as by causing the mobile phone to vibrate, generate an audible ring tone, or flash, as well as sending a SIP 180 ringing message toward UE-A (330-336), indicating to user A that the user B mobile is ringing. Providing user A with faster alerting that the call is being placed makes it less likely that user A will hang up in frustration before the call can be completed. Likewise, providing the called party (user B) with early alerting allows the called party to answer closer in time to completion of the signaling process, which reduces the overall amount of time it takes to establish a call between user A and user B.

In FIG. 3, all of the signaling messages are the same as the process illustrated in FIG. 3, except that the SIP ringing notification has been moved forward in time to enable both users to be alerted earlier in the call sequence.

Since user B's mobile phone will start the alerting sequence to alert User B that a call has been established before all of the signaling for the call has been completed, there is a possibility that user B may answer the phone before the CS bearer channel has been fully established for the call in the wireless network. According to an embodiment of the invention, if the user answers the call before the bearer channel has been established and matched to the media channel associated with the SIP call, the mobile, MGCF, MSC, or other construct on the network, may provide the user with a short message or other audible signal that the call will be connected shortly. The connection to the user may then be placed on hold until the call can be connected through between user A and user B.

According to one embodiment, as shown in FIG. 3, the ringing process may be started at a desired point in time after the SIP invite has been received by the user equipment. In one embodiment, a fixed delay is provisioned on the handset, such as 4 seconds, so that the user equipment will start ringing automatically four seconds after receipt of the SIP invite. This enables the phone to start notifying the user approximately mid-way through the call setup process so that the amount of time the calling party is required to wait to receive confirmation that the call is being connected is reduced to approximately 4 seconds. Since the normal human reaction time associated with answering a telephone is on the order of a few seconds, this may enable the call to be established close to the end of call establishment signaling and, ideally, just after call establishment has completed.

According to another embodiment, the alerting process may be started after an amount of delay specified by the SIP invite (310). In this embodiment, the SCC AS may add a new SIP header to the INVITE message, specifying an amount of delay that should elapse between receipt of the SIP invite and initiation of the alerting process by the handset. For example, a header such as "x-nt-ring-delay: 4000 ms" may be used to specify that the handset should wait four seconds after receipt of the SIP invite before initiating the alerting process. If the handset receives this new header, it will present ringing to the handset after the delay specified in the header.

In this example, x is a SIP designator which designates the header as a proprietary header. If adopted by the SIP standards body, a different header format may be used as defined by that body. SIP is defined in IETF RFC 3261, the content of which is incorporated herein by reference. As that standard evolves, it would be expected that the various messages associated with establishing a call on the network may change. The teachings of this disclosure may be adapted to provide for time delayed alerting of a user in connection with call establishment in these future versions as well and the invention is not limited to implementation in connection with the current version of the standard.

In another embodiment, the handset can optionally report back to the network the delay between receipt of the connect for the call signaling portion and the answer from the handset, e.g. when user B answers the mobile phone. This value may be reported in milliseconds. A negative number indicates that the call was answered before the call signaling was established, which indicates that it is necessary to increase the delay on future calls. Stated differently, if the user responds to the alert sequence before the call signaling has been completed, the amount of time (negative value) may be passed to the network to enable the network to increase the amount of time between receipt of a SIP invite and the onset of the alerting process. Likewise, if the user responds to the alert sequence significantly after the call setup process has completed, it may make sense to reduce the amount of time between receipt of the SIP invite and onset of the call alerting process. Thus, feedback may be used to dynamically adjust the amount of delay time associated with onset of the alert process after receipt of the SIP invite by the user.

Ideally, as noted above, the amount of delay should be adjusted so that the user answers the phone a period of time after call signaling has been completed. The period of time between completion of call signaling and the target time for the user to answer the call will be referred to herein as a buffer. Typically, a buffer of between ½ and 1 second should suffice to account for normal variations in how fast a user will answer the phone, although other buffer values may be used as well.

The amount of delay may be set for all users as a group, or alternatively the amount of delay may be implemented on a per-user basis so that different delay values may be set for different users or types of users. For example, user 1 may typically answer his cell phone after four alert cycles (e.g. after four rings) whereas user 2 may typically answer her cell phone after only two alert cycles. To cause both of these users to answer their cell phone at the desired time relative to completion of call signaling, the amount of delay provided for each of the users may be adjusted.

FIGS. 4A-4B and 5A-5B show graphically how this may be implemented. Specifically, in FIG. 4A when a call is initiated by user A (500), a short time thereafter a SIP invite (502) will be received by user B's mobile phone. The SIP invite, in one embodiment, will contain a configurable delay (504) to instruct the mobile phone when it should start the alert sequence (506) to notify the user of the impending connection.

After the delay, the mobile phone will start the alert sequence, and it will take a finite amount of time (508) for the user to answer the call (510). Ideally, the user should answer the call at the end of the buffer period, e.g. a particular period of time after call setup has been completed (512). In the example shown in FIG. 4A, the user has answered the call before call setup is complete. Hence, a time delta 514 exists between when the user answered the call and when the call should be answered. To prevent user B from hanging up, specific tones may be played to the user.

Figure 4A:
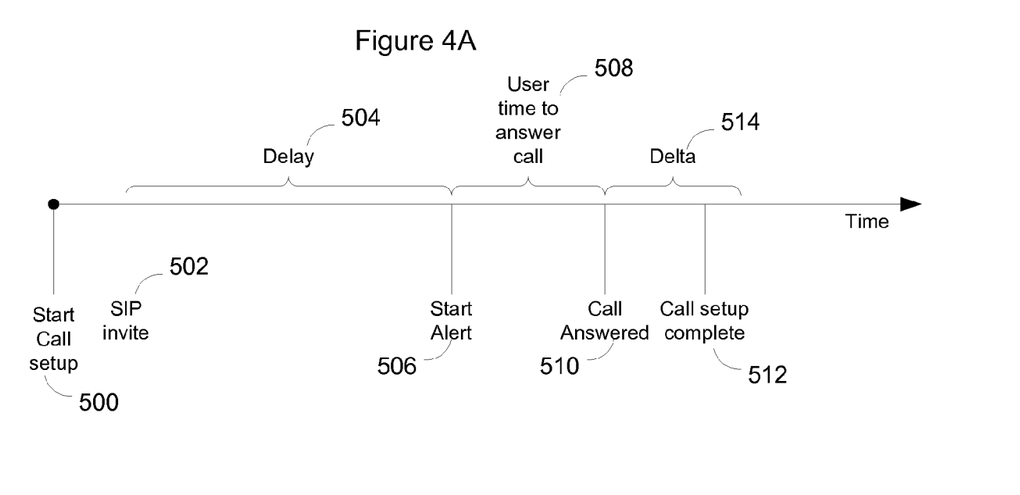
FIGS. 4A-4B are timing diagrams showing adjustment of a network provisioned delay where the user answers a call too soon.
Figure 4B:
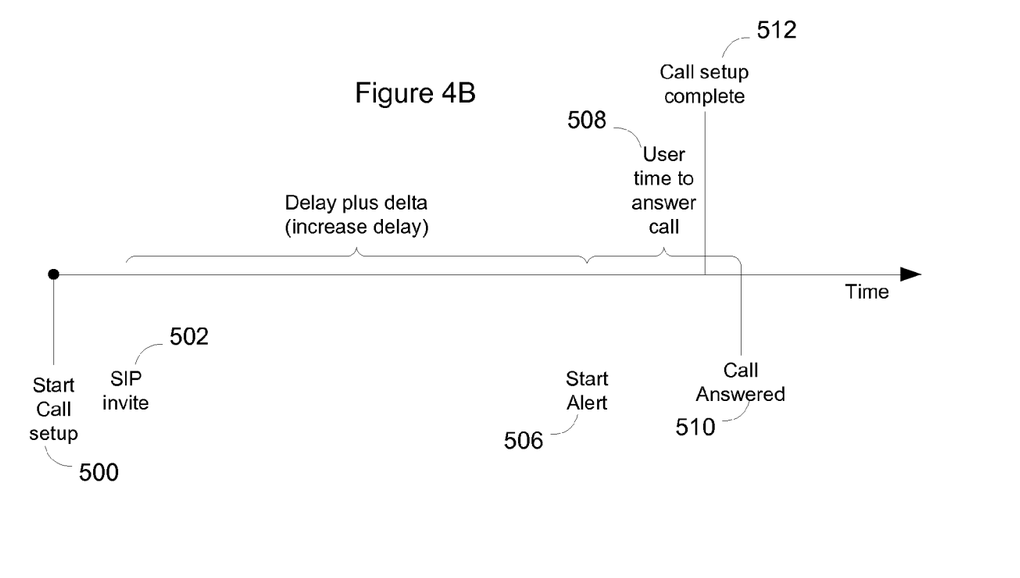

To enable phone future phone calls to be answered closer in time to the end of the buffer period, the delta 514 may be used to adjust the delay 504 for future calls, as shown in FIG. 4B. In the example shown in FIG. 4B, the delta 514 has been added to the delay 504 so that, assuming it takes the same amount of time to complete call setup and for the user to answer the call, the call answered event 510 should occur approximately at the end of the buffer after completion of call signaling 512. The delta 514 may be used directly as shown, or more used in connection with other delta measurements from previous calls to enable the delay 504 to be influenced over time to converge on an optimal delay value.

The optimal delay may be calculated for each user individually, for groups of users, for categories of users, or in some other manner. The delay may also be adjusted based on activities occurring at the mobile phone or based on other contextual information. For example, if the mobile phone has other applications running that are currently being used by the user, the amount of time to respond to an incoming phone call may be expected to be less than if the mobile phone is sitting idle. Thus, for example, if the user is typing an e-mail or instant message on the keyboard of the mobile phone, the mobile phone may add an additional amount of delay to the network instructed delay 504 to account for the fact that the user is currently interacting with the phone and thus much more likely to be able to quickly answer the incoming telephone call.

Figure 5A:
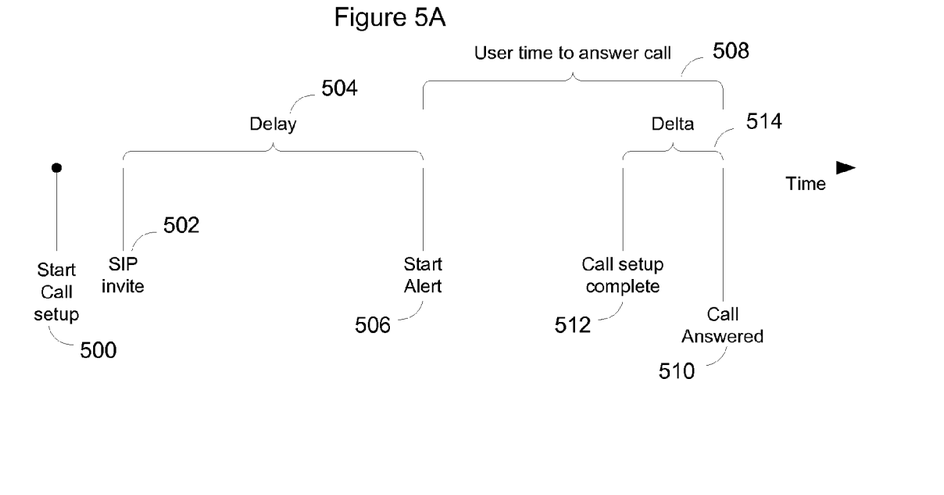
FIGS. 5A-5B are timing diagrams showing adjustment of a network provisioned delay where the user answers a call too late.
Figure 5B:
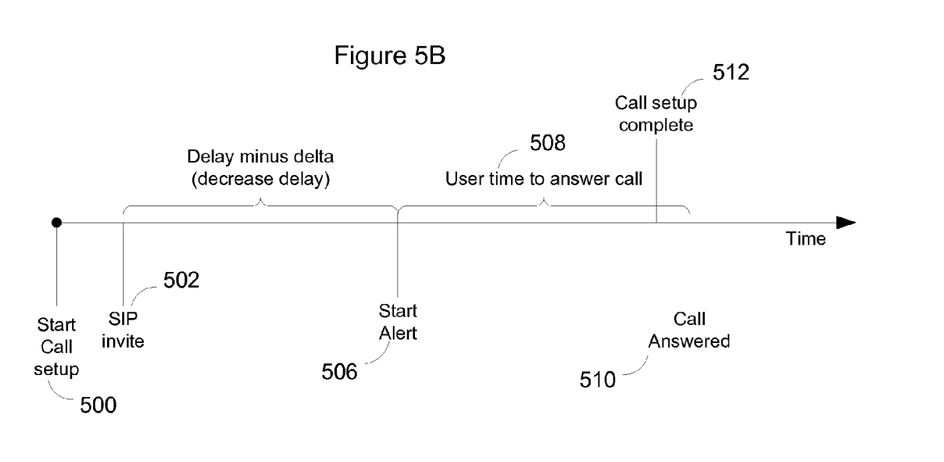

FIGS. 5A-5B show a similar scenario, except in this example the user is taking longer to answer the call so that the user answers the call several seconds after call setup is complete. In this example, the network configured delay 504 is too long, so the delta 514 should be subtracted from the delay 504 for future telephone calls. Determining whether to add/subtract may be implemented by assigning a positive or negative sign to the delta depending on whether the user answered the call to early or too late.

Since the amount of time to complete call setup will vary with each individual phone call, and the amount of time it takes for a user to answer a call will also vary for each individual phone call, it may be expected that the network provisioned delay will frequently be off somewhat from the ideal value. However, by utilizing a delay that is approximately correct it should be possible to cause the called party to answer the call closer in time to completion of call signaling than was possible in the signaling process shown in FIG. 2. Specifically, by starting the alerting process at a configured delay after receipt of a SIP invite message, the user may be notified before call signaling is completed. This enables the user to answer the call sooner than is possible where the alerting process only starts after signaling is completed.

Likewise, by providing the person making the telephone call with notification that the called person is being alerted (i.e. playing a ringing tone to the person making the call) the person making the telephone call has the impression that the system is able to establish a connection so that the person making the phone call is less likely to terminate the process.

Where the amount of delay is conveyed by SIP signaling, the SIP UA process (UE-B) on the wireless phone may be programmed to receive the SIP invite with a header specifying the delay, and use the delay information from the header to initiate onset of the alerting process. The alerting process includes not only sending SIP message 180 (ringing) but also interacting with one or more other processes on the mobile phone to cause the phone to vibrate, light up, make noise, or generate other signals to alert the user of the impending phone call. Alternatively, UE-B may be programmed to automatically delay onset of the alert sequence where a cellular bearer channel is required to be set up in order to complete an incoming call associated with the SIP invite.

Likewise, from a network standpoint, the SCC-AS may be programmed to insert header specific delay into a SIP invite where the call associated with the SIP invite is required to be connected to a separate bearer channel in the mobile network. In this embodiment, the SCC-AS would add a header specifying the amount of delay so that the mobile phone may start the alerting process at a specified time while the call is being signaled. Other components within the network may insert the header as well, although the SCC-AS has the advantage of knowing when the call signaling process has been completed and, thus, is in the position to implement feedback in connection with adjusting the delay 504 as discussed above in connection with FIGS. 4A-4B and 5A-5B. In an alternate embodiment, the delay 504 may be adjusted by an algorithm on the mobile instead of depending on a network derived and provided delay.

Where the delay is to be adjusted on a per-user basis, the SCC-AS or another network element may maintain a table containing information about the amount of time it takes the user to answer a telephone call. Optionally, multiple values may be stored for a particular user so that a specific value may be selected based on the context of the phone call. For example, the speed with which the user answers a phone call may vary depending on the time of day, weekday vs. weekend, and whether the user is otherwise interacting with the mobile phone. Thus, the table may maintain multiple values and the context associated with the incoming phone call may be used to select a delay value to be inserted as a SIP header into the SIP invite for the particular call.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of initiating an alert process by a wireless phone associated with the establishment of a wireless telephone call prior to completion of a signaling process associated with establishing the wireless telephone call, the method comprising the steps of:
   receiving, by the wireless phone, a session invite via a wireless packet subsystem of a wireless network, the session invite requesting establishment of the wireless telephone call with the wireless phone on the wireless network;
   initiating establishment of a bearer circuit call by the wireless phone on a bearer channel of the wireless network; and
   initiating the alert process, by the wireless phone, upon expiration of a first delay timer, the first delay timer starting upon receipt of the session invite by the wireless phone.

2. The method of claim 1, wherein the session invite is a Session Initiation Protocol (SIP) invite.

3. The method of claim 1, wherein the bearer circuit call is implemented by a circuit subsystem agent on the wireless phone so that the bearer circuit call is established using circuit-switched access for the bearer channel.

4. The method of claim 3, wherein the session invite contains a Public Service Identifier Directory Number (PSI DN) associated with a Session Continuity and Control Application Server (SCC AS), and wherein the step of initiating establishment of the bearer circuit call is implemented on the circuit-switched access to initiate establishment of a call to the PSI DN of the SCC AS.

5. The method of claim 4, wherein the session invite is a Session Initiation Protocol (SIP) invite.

6. The method of claim 1, wherein the step of initiating the alert process, by the wireless phone, comprises emitting at least one of an audible, visual, and tactile alert.

7. The method of claim 1, wherein the step of initiating the alert process comprises sending a SIP Ringing message, by the wireless phone on the wireless network.

8. The method of claim 1, wherein the first delay timer is configured to provide a first amount of delay, and wherein the session invite specifies the first amount of delay.

9. The method of claim 8, wherein the first amount of delay is adjustable by a SCC AS based on feedback related to a speed with which a user of the wireless phone has historically answered other previously established phone calls after initiation of the alert process by the wireless phone.

10. The method of claim 9, wherein the first amount of delay is adjusted on a per-user basis.

11. The method of claim 8, wherein the first amount of delay is adjusted to cause the step of initiation of the alert process to occur so that a user answers the wireless phone after completion of the signaling process associated with establishing the wireless telephone call.

12. The method of claim 1, wherein the first delay timer is configured to provide a first amount of delay, and wherein the wireless phone is programmed with the first amount of delay prior to receipt of the session invite.

13. The method of claim 12, wherein the wireless phone is configured to adjust the first amount of delay based on feedback related to a speed with which a user of the wireless phone has historically answered other previously established phone calls after initiation of the alert process by the wireless phone.

14. The method of claim 1, wherein expiration of the first delay timer occurs before completion of a signaling process associated with establishing the wireless telephone call.

15. A method of establishing a hybrid Voice over Internet Protocol (VoIP) call combining packet based signaling with circuit based media, the method comprising the steps of:
    transmitting a session invite containing a header specifying an amount of time that a mobile telephone should wait between receipt of the session invite and initiation of an alerting process by the mobile telephone.

16. The method of claim 15, wherein the session invite is a Session Initiation Protocol (SIP) invite.

17. The method of claim 15, wherein the alerting process comprises sending a ringing response by the mobile telephone.

18. The method of claim 15, wherein the alerting process comprises emitting at least one of an audible, visual, and tactile alert.

19. The method of claim 15, further comprising a step of adjusting the amount of time that the mobile telephone should wait based on how fast a user associated with the mobile telephone answered previous telephone calls.

20. A method of initiating an alert process by a wireless phone associated with the establishment of a wireless telephone call prior to completion of a signaling process associated with establishing the wireless telephone call, the method comprising steps of:
    receiving, by the wireless phone, a session invite via a wireless packet subsystem of a wireless network, the session invite requesting establishment of the wireless telephone call with the wireless phone on the wireless network;
    initiating establishment of a bearer circuit call by the wireless phone on a bearer channel of the wireless network; and
    initiating the alert process, by the wireless phone, upon expiration of a first delay timer that is configured to provide a first amount of delay, the first delay timer starting upon receipt of the session invite by the wireless phone, the wireless phone being programmed with the first amount of delay prior to receipt of the session invite.

* * * * *